(12) United States Patent
Nesper et al.

(10) Patent No.: US 9,045,346 B2
(45) Date of Patent: Jun. 2, 2015

(54) STABLE DISPERSIONS OF SINGLE AND MULTIPLE GRAPHENE LAYERS IN SOLUTION

(75) Inventors: Reinhard Nesper, Amden (CH); Tommy Kaspar, Mels (CH)

(73) Assignee: Belenos Clean Power Holdings AG, Bienne (CH)

( * ) Notice: Subject to any disclaimer, the term of this patent is extended or adjusted under 35 U.S.C. 154(b) by 687 days.

(21) Appl. No.: 12/787,570

(22) Filed: May 26, 2010

(65) Prior Publication Data

US 2010/0301279 A1 Dec. 2, 2010

(30) Foreign Application Priority Data

May 26, 2009 (EP) .................................. 09161106

(51) Int. Cl.
*C01B 31/00* (2006.01)
*C01B 31/04* (2006.01)
*B82Y 30/00* (2011.01)
*B82Y 40/00* (2011.01)
*H01M 4/587* (2010.01)

(52) U.S. Cl.
CPC ............. *C01B 31/0476* (2013.01); *B82Y 30/00* (2013.01); *B82Y 40/00* (2013.01); *C01B 2204/02* (2013.01); *C01B 2204/28* (2013.01); *C01B 2204/30* (2013.01); *H01M 4/587* (2013.01); *Y02E 60/122* (2013.01); *Y02E 60/324* (2013.01)

(58) Field of Classification Search
CPC .......... B82Y 30/00; B82Y 40/00; H01B 1/04; C01B 31/0476

USPC ....... 252/500–511; 977/734, 755; 423/445 R, 423/445 B
See application file for complete search history.

(56) References Cited

U.S. PATENT DOCUMENTS

| | | | |
|---|---|---|---|
| 5,476,580 | A | 12/1995 | Thorn et al. |
| 2007/0284557 | A1 | 12/2007 | Gruner et al. |
| 2009/0127514 | A1* | 5/2009 | Korkut et al. ................. 252/500 |
| 2010/0035093 | A1* | 2/2010 | Ruoff et al. .................... 429/12 |

(Continued)

FOREIGN PATENT DOCUMENTS

| | | |
|---|---|---|
| WO | 2007/031055 A1 | 3/2007 |
| WO | 2008/048295 A2 | 4/2008 |

(Continued)

OTHER PUBLICATIONS

McAllister et al. ("Single Sheet Functionalized Graphene by Oxidation and Thermal Expansion of Graphite." Chem. Mater., 19, pp. 4396-4404, pub online May 25, 2007).*

(Continued)

*Primary Examiner* — Tri V Nguyen
(74) *Attorney, Agent, or Firm* — Griffin & Szipl, P.C.

(57) ABSTRACT

A method for producing colloidal graphene dispersions comprises the steps of: (i) dispersing graphite oxide in a dispersion medium to form a colloidal graphene oxide or multi-graphene oxide dispersion, and (ii) thermally reducing the graphene oxide or multi-graphene oxide in dispersion. Depending on the method used for the preparation of the starting dispersion, a graphene or a multi-graphene dispersion is obtained that can be further processed to multi-graphene with larger inter-planar distances than graphite. Such dispersions and multi-graphenes are, for example, suitable materials in the manufacturing of rechargeable lithium ion batteries.

27 Claims, 4 Drawing Sheets

(56) References Cited

U.S. PATENT DOCUMENTS

| | | | |
|---|---|---|---|
| 2010/0055025 A1* | 3/2010 | Jang et al. | 423/448 |
| 2010/0176351 A1* | 7/2010 | Ruoff et al. | 252/510 |
| 2010/0303706 A1 | 12/2010 | Wallace et al. | |
| 2011/0052813 A1* | 3/2011 | Ho et al. | 427/256 |

FOREIGN PATENT DOCUMENTS

| | | | | |
|---|---|---|---|---|
| WO | WO2009029984 A1 * | 3/2009 | | C01B 31/02 |
| WO | 2009/049375 A1 | 4/2009 | | |

OTHER PUBLICATIONS

Szabo et al. ("Enhanced acidity and pH-dependent surface charge characterization of successively oxidized graphite oxides." Carbon, 44, pp. 537-545, online Sep. 23, 2005).*

Park et al., "Chemical methods for the preparation of graphenes," Nature Nanotechnology, vol. 4, Apr. 2009, pp. 217-223.

Stankovich et al., "Synthesis of graphene-based nanosheets via chemical reduction of exfoliated graphite oxide," Carbon, vol. 45, 2007, pp. 1558-1565.

Park et al., "Colloidal Suspensions of Highly Reduced Graphene Oxide in a Wide Variety of Organic Solvents," Nano Letters, vol. 9, 2009, pp. 1593-1597.

European Search Report issued in corresponding application No. EP09161106, completed Dec. 7, 2009.

Nethravathi, C., et al., "Chemically modified graphene sheets produced by the solvothermal reduction of colloidal dispersions of graphite oxide," Carbon 46 (2008) pp. 1994-1998.

Li, Dan et al. "Processable aqueous dispersions of graphene nanosheets," Published online: Jan. 27, 2008, nature nanotechnology vol. 3. Feb. 2008, www.nature.com/nanotechnology, pp. 101-105.

Geim, A. K., et al., "The rise of graphene," nature materials vol. 6, Mar. 2007, www.nature.com/naturematerials, pp. 183-191.

Kim, Keun Soo, et al., "Large-scale pattern growth of graphene films for stretchable transparent electrodes," nature vol. 457, Feb. 5, 2009, pp. 706-710.

Moore, Valerie C., et al., "Individually Suspended Single-Walled Carbon Nanotubes in Various Surfactants," Nano Letters, 2003, vol. 3 No. 10, pp. 1379-1382.

Huang, Weijie et al., "Solubilization of Single-Walled Carbon Nanotubes with Diamine-Terminated Oligomeric Poly (ethylene Glycol) in Different Functionalization Reactions," Nano Letters, 2003, vol. 3 No. 4, pp. 565-568.

U.S. Appl. No. 61/144,898, filed herewith as Exhibit A.

Sungjin Park et al., Chemical Methods for the Production of Graphenes, 4 Nature Nanotechnology 217-223 (Apr. 2009), filed herewith as Exhibit B.

Espacenet—Bibliographic Data corresponding to U.S. Patent Application Publication No. US 2010/0303706 A1, filed herewith as Exhibit C, and which was last updated on Dec. 19, 2012.

D. Li et al., "Processable Aqueous Dispersions of Graphene Nanosheets," 3 Nature Nanotech. 101-105 (2008), abstract only, which abstract is filed as "Exhibit D," at http://www.nature.com/nnano/journal/v3/n2/pdf/nnano.2007.451.pdf (downloaded Oct. 8, 2013), (Full Article previously made of record).

Fan Li Hong, Synthesis and Characterization of Composite Graphite Oxide Intercalation (2008)(Master's Thesis, Shaanxi Normal University), Executive Summary, at http://www.dissertationtopic.net/doc/784732 (downloaded Oct. 8, 2013), the Executive Summary is filed as "Exhibit E."

Daniel R. Dreyer et al., The Chemistry of Graphene Oxide, 39 Chemical Society Reviews 228-240 (2010).

D.D.L. Chung, Review Graphite, 37 Journal of Materials Science 1-15 (2002).

G.I. Titelman et al., Characteristics and Microstructure of Aqueous Colloidal Dispersions of Graphite Oxide, 43 Carbon 641-649 (2005).

* cited by examiner

STABLE DISPERSIONS OF SINGLE AND MULTIPLE GRAPHENE LAYERS IN SOLUTION

This application claims priority from European Patent Application No. 09161106.1, filed May 26, 2009, the entire disclosure of which is incorporated herein by reference.

TECHNICAL FIELD

The present invention concerns the field of electronically conductive carbonaceous materials and their production, in particular, materials suitable for use in rechargeable lithium ion batteries.

BACKGROUND ART

The term graphene designates a one atom thick planar sheet of $sp^2$-hybridized rings with 6 carbon atoms. Perfect graphenes consist exclusively of hexagonal cells. Cylindrical graphene layers are termed carbon nanotubes. The term graphene may also be used when features of single layers in graphite are discussed. Such features are, e.g., reactivity or undergone reactions, respectively, or structural relations.

Graphene layers may be produced by suitable abrasion, mechanical exfoliation or chemical vapour deposition. One such method is the so-called Scotch-Tape-Method [10]. In this method single layers are removed from a graphite crystal and transferred to a sample holder.

In a recently described chemical vapour deposition method is disclosed, wherein, prior to being able to generate a graphene layer, a $SiO_2/Si$ substrate has to be covered with a thin Ni layer, and this coated substrate has to be subjected to a specific gas treatment. For making the graphene layer usable to coat other substrates, the Ni or the $SiO_2$ layer has to be dissolved. Such graphene films had very good electrical, optical and mechanical (e.g. bending) properties [9].

Another method is to heat silicon carbide to high temperatures (1100° C.) to reduce it to graphene. This process produces a layer, the extent of which is dependent on the size of the SiC substrate used, and, due to the expensive starting material, is quite expensive and also limited in use due to the high temperature needed.

Graphene is quite different from most solids. Graphene behaves as a semi-metal or "zero-gap" semiconductor and has a remarkably high electron mobility at room temperature.

Aqueous dispersions of carbonaceous material, such as graphite, graphene or carbon nanotubes, are described in the literature. The production of aqueous graphite dispersions from graphite with preferred particle sizes between 1 μm and 50 μm or 100 μm, respectively, stabilized by various dispersants, has been described (see e.g., U.S. Pat. No. 5,476,580 and WO2007/031055). Up to 20% by weight or up to 70% by weight, respectively, graphite may be dispersed in water.

Dispersions of carbon nanotubes with a nanotubes content of 2% are, e.g., obtainable by stabilization with the dispersing aid polyethylene glycol [1] or via chemical functionalizing of the carbon nanotubes [2].

WO2008/048295 describes a method for stabilizing graphene layers in a solvent by means of polymer coating. An about 0.065% by weight graphene based material is obtained. The colloidal graphene dispersion is provided by reduction of dispersed graphite oxide using hydrazine hydrate.

Dan Li et al. [3] describe that the aqueous solution may be electrostatically stabilized by ammonia resulting in a graphene based material with graphene content of about 0.015% by weight. Also Dan Li et al. prepared the colloidal graphene dispersion from a graphite oxide dispersion by reduction with hydrazine hydrate. The reduction with hydrazine hydrate as disclosed in the state of the art results in a C/O ratio of below 13.5, meaning that at most about 80% of the oxygen has been removed [4, 5, 6].

Another method for reduction of graphite oxide is thermal reduction. Dependent on the desired production conditions, purity conditions and reduction conditions, the thermal reduction of graphite oxide powder is slow up to a temperature of about 200° C., and then becomes boisterous [7]. Reduction at this temperature results in an elimination of about 65% of the oxygen, 10% of the carbon, and most of the hydrogen, due to the formation of CO, $CO_2$ and water. Heating to higher temperatures results in continuous further reduction. A temperature of about 1000° C. is required for removal of about 90% of the oxygen. Thus produced graphite material can no longer be dispersed in water to form a colloidal dispersion.

Hence, it is a general object of the present invention to provide a method for producing stable colloidal dispersions of graphene in solution, in particular, colloidal graphene dispersions that do not need any dispersant.

It is also an object of the present invention to provide stable dispersions of single and multiple graphene layers.

It is also an object of this invention to provide uses of such graphene dispersions.

It is a further object of the invention to provide a multi-graphene with improved intercalating features that may, e.g., advantageously be used for the production of electrodes in rechargeable lithium ion batteries.

SUMMARY OF THE INVENTION

Now, in order to implement these and still further objects of the invention, which will become more readily apparent as the description proceeds, the method for producing colloidal graphene dispersions is generally manifested by the features wherein it comprises the steps of:

(i) dispersing graphite oxide in a dispersion medium to form a colloidal graphene oxide or graphite oxide dispersion, and (ii) thermally reducing the graphene oxide or graphite oxide in dispersion. Thus, in accordance with a first non-limiting illustrative embodiment of the present invention, a method for producing colloidal graphene dispersions or multi-graphene dispersions includes the steps of: (a) dispersing graphite oxide in a dispersion medium to form a colloidal graphene oxide dispersion or a multi-graphene oxide dispersion; and (b) thermally reducing the graphene oxide or multi-graphene oxide in dispersion.

In accordance with a second non-limiting illustrative embodiment of the present invention, the first illustrative embodiment is modified so that step (b) is performed at a temperature of at least 120° C. In accordance with a third non-limiting illustrative embodiment of the present invention, the first illustrative embodiment is modified so that step (b) is performed at a temperature of 120° C. to 130° C. In accordance with a fourth non-limiting illustrative embodiment of the present invention, the first illustrative embodiment is modified so that step (b) is performed at a temperature of at least 130° C. In accordance with a fifth non-limiting illustrative embodiment of the present invention, the first illustrative embodiment is modified so that step (b) is performed at a temperature of at least 150° C.

In accordance with a sixth non-limiting illustrative embodiment of the present invention, the first illustrative embodiment is modified so that the dispersion medium is a protic, polar dispersion medium, preferably a water based dispersion medium. In accordance with a seventh non-limiting illustrative embodiment of the present invention, the sixth illustrative embodiment is further modified so that the dispersion medium is water, the dispersion in step (a) is a colloidal graphene oxide dispersion and the dispersion produced in step (b) is a colloidal graphene dispersion. In accordance with an eighth non-limiting illustrative embodiment of the present invention, the sixth illustrative embodiment is further modified so that the dispersion medium comprises ammonia.

In accordance with a ninth non-limiting illustrative embodiment of the present invention, the first illustrative embodiment is modified so that the dispersion medium is an aprotic, polar dispersion medium, preferably acetonitrile. In accordance with a tenth non-limiting illustrative embodiment of the present invention, the first illustrative embodiment is modified so that step (b) is performed at a temperature and for a time to result in a colloidal graphene dispersion with a carbon:oxygen (C/O) ratio of at least 4 and preferably at most 13, such as about 7, most preferred or at least 13.5, preferably at least 20, more preferred at least 25. In accordance with an eleventh non-limiting illustrative embodiment of the present invention, the sixth illustrative embodiment is further modified so that the dispersion medium is acidified water, preferably water of a pH of about 4, the dispersion in step (a) is a multi-graphene oxide dispersion and the dispersion produced in step (b) is a multi-graphene dispersion.

In accordance with a twelfth non-limiting illustrative embodiment of the present invention, a method for producing a graphene or multi-graphene layer or multi-graphene particles using the method according to any one of the first, second, third, fourth, fifth, sixth, seventh, eighth, ninth, tenth, and eleventh illustrative embodiments, wherein the method for producing a graphene or multi-graphene layer, or multi-graphene particles, includes the steps of: (i) dispersing graphite oxide in a dispersion medium to form a graphene oxide or multi-graphene oxide dispersion; and (ii) thermally reducing the graphene oxide or multi-graphene oxide in dispersion, and either deposit on a substrate or precipitate the dispersion of step (i) and then perform step (ii) or deposit on a substrate or precipitate the dispersion of step (ii). In accordance with a thirteenth non-limiting illustrative embodiment of the present invention, a colloidal graphene dispersion, preferably obtainable by the method according to the first, second, third, fourth, fifth, sixth, seventh, eighth, ninth, tenth, eleventh or twelfth illustrative embodiments, is provided with a C/O ratio of at least 4 and preferably at most 13, such as about 7, or with a C/O ratio of at least 13.5, preferably at least 20, more preferred at least 25. In accordance with a fourteenth non-limiting illustrative embodiment of the present invention, the thirteenth illustrative embodiment is modified so that the colloidal graphene dispersion has a graphene content of 0.1% to 0.5% by weight, or preferably about 0.1% by weight. In accordance with a fifteenth non-limiting illustrative embodiment of the present invention, the thirteenth illustrative embodiment is modified so that the colloidal graphene dispersion does not comprise any dispersant.

In accordance with a sixteenth non-limiting illustrative embodiment of the present invention, a multi-graphene dispersion or isolated multi-graphene with an inter-planar distance in the multi-graphene of greater than 3.35 Å, or preferably greater than 3.40 Å, or greater than 3.50 Å, or greater than 3.60 Å, is provided. In accordance with a seventeenth non-limiting illustrative embodiment of the present invention, the use of a colloidal graphene dispersion as defined by the thirteenth, fourteenth, or fifteenth illustrative embodiments, or of the method according to the twelfth illustrative embodiment, provides nanoparticles with an electronically conducting coating having a C/O ratio of at least 13.5. In accordance with an eighteenth non-limiting illustrative embodiment of the present invention, the use of a multi-graphene, obtainable by the method of the eleventh or twelfth illustrative embodiment, or as defined by the sixteenth illustrative embodiment, as an electrode material in rechargeable lithium ion batteries is provided. In accordance with a nineteenth non-limiting illustrative embodiment, the use of a multi-graphene with low C/O ratio, as obtainable by the method according to the eleventh or the twelfth illustrative embodiment, as electrode material in rechargeable lithium ion batteries is provided.

In accordance with a twentieth non-limiting illustrative embodiment of the present invention, a method for generating electronically conducting nanoparticles comprising the step of coating nanoparticles with a graphene dispersion of any one of the thirteenth, fourteenth or fifteenth embodiments, or coating nanoparticles with a graphene oxide dispersion, and then thermally reducing the coated particles in dispersion to get nanoparticles coated with graphene/multi-graphene of a C/O ratio of at least 13.5. In accordance with a twenty-first non-limiting illustrative embodiment of the present invention, a method for preparing an electrode for rechargeable lithium ion batteries is provided that includes the step of providing a multi-graphene by the method of the eleventh or twelfth illustrative embodiments, or as defined by the sixteenth illustrative embodiment, and coating a conductor with the multi-graphene, optionally in the presence of a binder. In accordance with a twenty-second non-limiting illustrative embodiment of the present invention, a method for preparing an electrode for rechargeable lithium ion batteries is provided that includes the step of providing a multi-graphene with a low C/O ratio of at most 13, and coating a conductor with the multi-graphene, optionally in the presence of a binder.

DEFINITIONS OF TERMS EMPLOYED BY THE PRESENT DISCLOSURE

In the scope of the present invention, the dispersion related terms are used with the following meanings:

Dispersion is a two phase system consisting of a disperse phase in a dispersion medium, wherein the disperse phase is finely divided in the dispersion medium.

Disperse phase designates the solid, optionally colloidal phase.

Dispersion medium is used as a synonym to continuous phase and liquid phase. Since the dispersion medium is a substance or a mixture of substances known as solvents, also the term solvent or solvent phase is used. The dispersion medium may also comprise additives and adjuvants, such as dispersants.

Dispersants are substances that assist in stabilizing dispersions, which, e.g., prevent coagulation and/or aggregation of the dispersed phase, such as surfactants. In this text, dispersants are also termed dispersing agents, dispersing aids.

In the scope of the present invention, the terms describing the carbonaceous material are used as follows:

If not further specified, the term graphene alone, or in graphene oxide, designates a single layer of graphite or graphite oxide, respectively.

An assembly of two or more graphene layers with the usual inter-planar distance of graphite are termed graphite.

An assembly of two or more graphene layers with a larger inter-planar distance than in graphite are termed multi-graphene.

For graphite oxide, the same distinction is made, in particular, with regard to the product finally obtained therefrom.

The terms graphene/multi-graphene/graphite are used for carbonaceous materials with carbon:oxygen (C/O) ratio of ≥4, with the terms graphene oxide/multi-graphene oxide/ graphite oxide used for materials with a C/O ratio <4.

Reducing the graphene oxide in dispersion means that during the reduction step the graphene oxide/graphene, or graphite oxide/graphite, remains dispersed in solvent. For low boiling solvents, this can be achieved by heating the dispersion under pressure, e.g., in an autoclave, preferably an autoclave with a polytetrafluoroethylen (Teflon®) insert, or a glass autoclave.

Dependent on the desired carbon:oxygen (C/O) ratio, the thermal reduction step is performed at low temperatures of about 120 to 130° C., or at higher temperatures of at least about 130° C. Temperatures around 120° C. allow fine-tuning of the desired C/O ratio, but they cannot be used for reduction up to high C/O ratios or only at very long reaction times. The higher the reaction temperature, the faster the reduction proceeds. This allows the fast production of high C/O ratios.

For example, by the inventive method, already at 140° C., about 80% of the oxygen is removed and thus, already, at this temperature a C/O ratio of above 13.5 is obtained, i.e., a C/O ratio better than reported for reduction with hydrazine hydrate. Already at 250° C. (compared with the 1000° C. reported in the literature) more than 90% of the oxygen is removed while the colloidal dispersion of the single graphene layer is still "longtime stable."

Longtime stable in the context of the present invention means that the graphene remains colloidally dispersed for at least 1 day, preferably for at least 1 week, more preferred for at least 1 month or 3 months, most preferred for at least 1 year (measured at room temperature for a 0.1% by weight dispersion).

Colloidal graphene dispersions of the present invention are preferably produced with a graphene content of at most 0.5% by weight, usually about 0.1% by weight or, dependent on the application, even more diluted. Such stable dispersions may be obtained up to C/O ratios of more than 25.

A C/O ratio of 26, for example, means that about 90% of the oxygen has been removed, which proved to be a very good graphite/graphene purity for several applications. For many applications, however, poorer C/O ratios are already usable or even preferred. Such poorer C/O ratios are, e.g., a C/O ratio of at least 4, but preferably at most 13, such as a C/O ratio of about 7. For other applications, where high C/O ratios are preferred, such C/O ratio is at least 13.5, preferably at least 20, and more preferred at least 25.

In one embodiment of the invention, the dispersion is an aqueous dispersion. Such aqueous dispersion can be produced in a wide pH range of 4.5 to 14 without the need for a dispersant, although dispersants or other adjuvants and/or additives may be added to further improve the features of the dispersion or a layer formed thereof by graphene deposition.

Surprisingly, the inventors found that the parameters of the inventive method can be varied in a broad range without affecting the quality of the colloidal graphene dispersion.

A colloidal graphene oxide dispersion suitable as starting material can be prepared by stirring graphite oxide powder in the desired solvent, e.g., water, until the colloidal dispersion appears clear to the eye. If no clear dispersion is obtained after 1 to 5 hours, the dispersion may be centrifuged to remove undissolved impurities. The time needed may be shortened by the addition of minimal amounts of ammonia. Such amounts usually are below a level that would alter the pH obtained in the absence of ammonia.

It is also possible to accelerate dissolution by using ultrasonic treatment. However, such treatment reduces the size of the graphene oxide layers and therewith of the graphene layers.

The dispersion is then heated. A temperature of at least about 150° C. is presently assumed to be necessary for efficient reduction, in particular, for aqueous dispersions. More than 300° C. may further improve the C/O ratio, however, this is unnecessary for hitherto envisaged applications.

The heating speed is uncritical. A reaction time at the desired temperature of less than 5 hours has been found to be sufficient. Usually, already about 1 hour at the desired temperature is sufficient for aqueous dispersions. In the case of other solvents, adaptation of the parameters such as temperature and time may be advantageous.

Suitably, the high temperature reactions with low boiling solvents, such as water, are performed in an autoclave. Neither higher pressure than the pressure generated by the solvent is needed nor is a specific, e.g., inert, atmosphere required.

Solvents other than water that may be used are polar protic, but also polar aprotic solvents such as acetonitrile or formamide, may be used to practice the present invention.

Also, apolar solvents are suitable continuous phases for colloidal graphene dispersions. However, while the graphite oxide powder is readily dispersible in polar solvents, it is hardly or not wettable in apolar solvents. Thus, for producing a colloidal graphene dispersion in apolar solvents, the graphite oxide is dispersed in a polar solvent and then mixed with an apolar solvent, wherein the mixture of the polar solvent and the apolar solvent has to be miscible at high temperatures, although not at room temperature. Such mixture is then subjected to high temperature in an autoclave until the reduction to graphene took place. Then the polar solvent is removed, e.g., by decanting the upper phase or releasing the lower phase from a separation funnel. Solvent systems suitable for this method are known to the skilled person as TMS systems (Temperature Depending Multicomponent Solvent System).

The high thermal conductivity, the unusual electrical features and the high mechanical stability of graphene that is similar to, or even better than, the one of carbon nanotubes make graphene a very promising component of composite materials.

The colloidal graphene dispersions of the present invention may be used for coating substrates, such as nanoparticles, that may be used as electrode materials in rechargeable lithium batteries.

If, for chemical and/or technical reasons, it is impossible to produce a graphene/graphite comprising composite starting from the inventive colloidal graphene dispersion, then a graphite oxide or graphene oxide comprising composite material may be produced, and this material may then be reduced with the thermal reduction method of the present invention.

It has also been found that graphite oxide powder can directly be subjected to heat in a not drying environment, e.g., as indicated above in an autoclave, resulting in a multi-graphene, i.e., a carbonaceous material with larger interspace between two crystal lattice planes, i.e., between two graphene layers, and, therefore, with improved intercalating properties compared to graphite. Without wanting to be bound by any theory, it is assumed that the water present between the graphene oxide layers prevents the formation of "usual" graphite upon thermal reduction under not drying conditions.

Such multi-graphenes in dispersed or isolated form may either be produced directly or via precipitation from colloidal graphene dispersions, and they have an inter-planar distance of greater than 3.35 Å, preferably greater than 3.40 Å, or greater than 3.50 Å, or greater than 3.60 Å, e.g., 3.55 Å or 3.68 Å.

Under milder reaction conditions than used for graphene/multi-graphene production with high C/O ratio, e.g., 140° C. for 5 hours in an autoclave, a graphite based material may be obtained having a much larger inter-planar distance, e.g., of about 4.6 Å. Such a material, although having a "poor" C/O ratio was found to nevertheless have sufficient conductivity to be used as electrode material. Dependent on the C/O ratio, the material may be loaded with $Li^+$ ions and used as cathode material (graphite oxide like carbonaceous material), or it can be used as anode material with the ability to take up $Li^+$ ions in the inter-planar space. For example, graphite oxide with the chemical formula $C_8O_4H_2$ may be treated with LiOH to give (in case of optimal exchange) $C_8O_4Li_2$.

Electrodes may be produced by coating a conductor, such as an aluminum foil, with the carbonaceous materials of the present invention.

A further benefit of the present invention is that the reduction of graphite oxide or graphene oxide composite materials or coatings may be performed in the presence of materials that otherwise, when treated with the methods of the state of the art, would be destroyed, either by the chemical reaction or by the high temperature.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Modes for Carrying Out the Invention

Colloidal graphene dispersions can be readily produced by thermal reduction of colloidal graphene oxide dispersions.

The production method for the graphene oxide powder starting material is not critical. A suitable improved Brodie method has been described by Boehm et al. [8]. Starting from powdered graphite oxide, first a dispersion in the desired solvent or solvent system is produced.

Such colloidal graphene oxide dispersion can be readily obtained by stirring graphite oxide powder in a graphite oxide wetting (dispersing) solvent or solvent mixture or solvent system. The time needed for producing the colloidal graphene oxide dispersion can vary dependent on the solvent chosen, however the time needed can easily be determined visually, i.e. as soon as a clear "solution" (colloidal dispersion) is obtained, stirring can be ended and thermal reduction can be started. If the solution remains turbid after about 5 hours or if no reduction in turbidity can be observed for some time, impurities may be present that should be removed prior to starting thermal reduction, e.g. via centrifugation or a filtration step.

Ultrasonic treatment was found to speed up the "dissolution", however it also reduced the size of the graphene oxide and hence the size of the graphene layers. An alternative to ultrasonic treatment is the addition of very small amounts of ammonia.

If the solvent has a boiling point below or close to the desired reaction temperature, the thermal reduction is preferably performed in an autoclave to ensure that the solvent is not evaporated during the reduction step.

In spite of a high C/O ratio, the colloidal graphene dispersions of the present invention exhibit good stability. Such high C/O ratio is obtained at temperatures of about 150° C. and is already excellent at about 250° C. for aqueous dispersions. Treatment at more than 300° C. might lead to even improved dispersions, however, for most applications this is unnecessary. In addition, if deposition of graphene layers on substrates is desired during the reduction step, low temperatures are much favored for temperature sensitive substrates.

If for chemical and/or technical reasons it is impossible to produce a graphene/multi-graphene comprising composite starting from the inventive colloidal graphene dispersion, then a multi-graphene oxide or graphene oxide comprising composite material may be produced and this material may then be reduced with the thermal reduction method of the present invention.

The invention is now further described by means of some examples. In these examples an autoclave with a polytetrafluoroethylen (Teflon®) insert was used.

Example 1

Preparation of Graphite Oxide

Graphite oxide was prepared according to the well known method by Brodie as modified by Boehm et al. [8].

10 g graphite were thoroughly mixed with 85 g sodium perchlorate powder. The mixture was cooled to approx. −20° C. using an ice sodium chloride mixture and then slowly stirred with an efficient stirrer. Then 60 ml fuming nitric acid were very slowly added. The viscous green mass was stirred for an additional 30 minutes at room temperature. The mixture was left over night without agitation and then slowly heated to 60° C. for 10 hours. Then 2 liters of water were added to the reaction product, the mixture was filtered and once washed with diluted hydrochloric acid and at least twice, each time with 2 liters of water. After filtration, the obtained mass was freeze dried yielding about 14 g of graphite oxide as a very fluffy ivory colored powder.

Based on the elemental analysis of the graphite oxide the chemical formula $C_8O_4H_{1.7}$ results. After subtraction of hydrogen as water the formula $C_8O_{3.2}$ is obtained with a C/O ratio of 2.5. Using X-ray diffraction analysis it could be shown that the inter-planar distance of 3.35 Å in graphite was enlarged to 6.1 Å in dry graphite oxide.

Example 2

Preparation of a Colloidal Graphene Oxide Dispersion 100 mg of the graphite oxide obtained as described in Example 1 were added to 100 ml of deionized water, thoroughly stirred for 12 hours and then left in an ultrasonic bath for 1 hour. The such obtained colloidal dispersion of graphite oxide (further on referred to as graphene oxide), was then reacted to colloidal graphene dispersion (see below).

The colloidal graphene oxide dispersion obtained by dispersing graphite oxide in water was optically clear to the naked eye and even in the light microscope at 1000 fold magnification, free of particles and had a pH of about 5. Using a laser, the resulting Tyndall effect showed that the graphite oxide resulted in a colloidal dispersion.

If such dispersion is diluted and then applied to a suitable sample holder, scanning force microscopy reveals that the colloidal dispersion consists of single layers of oxidized graphene, i.e. graphene oxide.

Example 3

Preparation of a Coarse Multi-Graphene Oxide Dispersion 1 g of the graphite oxide obtained as described in Example 1 were added to 100 ml of deionized water acidified with hydrochloric acid to a pH of about 4. After stirring for 1 hour, the obtained coarse dispersion of multi-graphene oxide, was suitable for further reaction to a dispersion of multi-graphene (see below).

Example 4

Preparation of Colloidal Graphene Dispersion and Multi-Graphene

The colloidal graphene oxide dispersion of Example 2 was placed in an autoclave and heated at a temperature of 170° C. for 5 hours. During this treatment the single layers of the graphene oxide were reduced to graphene resulting in a colloidal dispersion of graphene in water.

The resulting colloidal graphene dispersion was deeply black and had a pH of about 5. To the naked eye and even in the light microscope at 1000 fold magnification, the dispersion was free of visible particles and—as the colloidal graphene oxide dispersion—showed the Tyndall effect of a colloidal dispersion.

Figure 1:
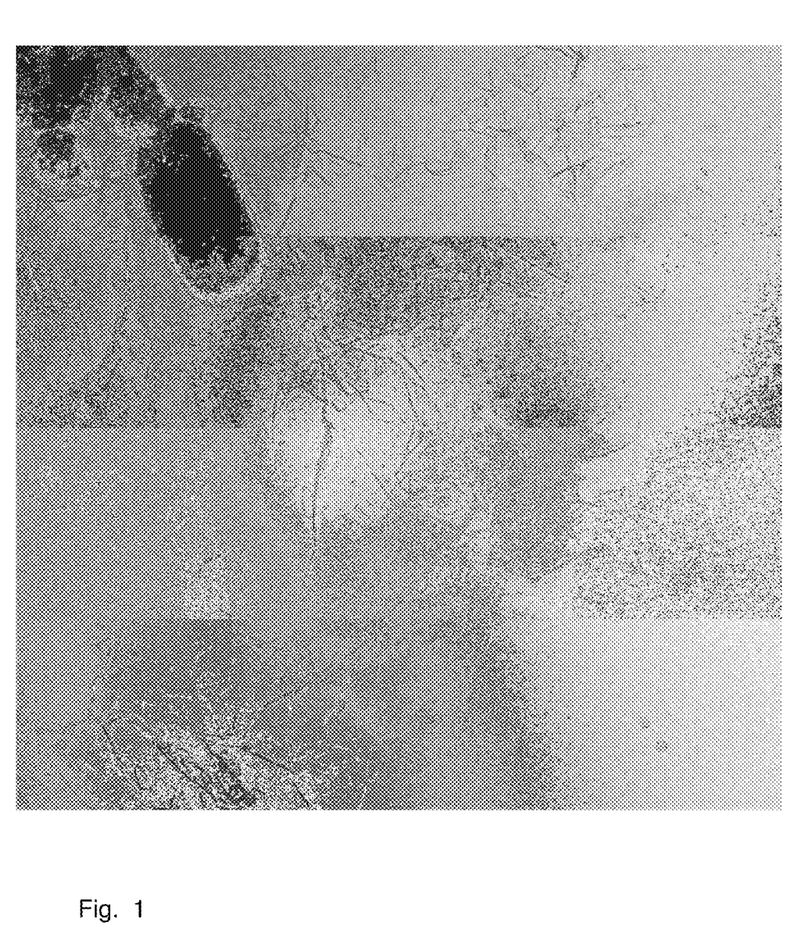
FIG. 1 is a cryo-transmission electron microscope image of a graphene dispersion.

Using image giving methods such as scanning force microscopy and transmission electron microscopy it could be shown to be a colloidal dispersion. The single layers are e.g. clearly recognizable in a cryo-transmission electron microscope image (FIG. 1).

The lateral diameter of the graphene layers was in the range of the lateral diameter of the starting material and thus was dependent of the diameter of the single graphene layers in the graphite prior to its oxidation to graphite oxide. By evaporation of the water from the dispersion the graphene could be precipitated as multi-graphene. Residual water was removed by drying in vacuum and the product was subjected to different tests.

Figure 2:
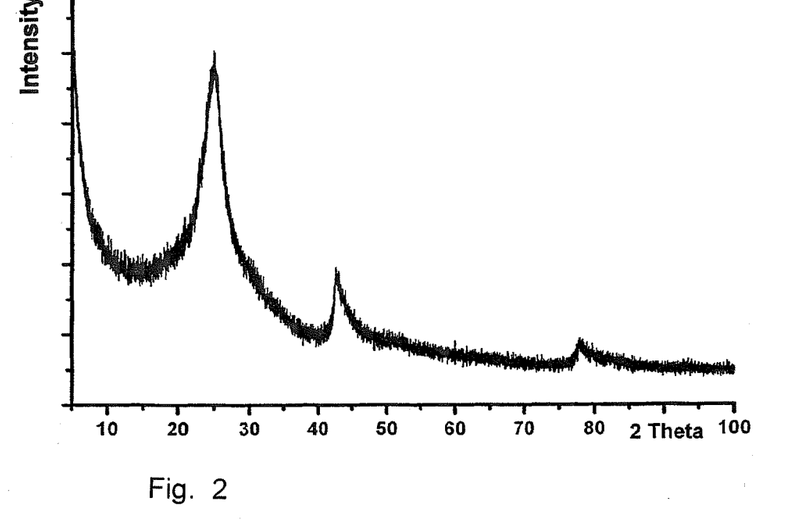
FIG. 2 is the powder diffractogram of multi-graphene precipitated from colloidal graphene dispersion showing reflexes similar to those of turbostratic graphite, but with inter-planar distances of 3.55 Å.

The powder diffractogram (FIG. 2) showed reflexes similar to those of turbostratic graphite with inter-planar distances of 3.55 Å.

Elemental analysis of the material gave the chemical formula $C_8O_{0.65}H_{0.5}$. After subtraction of hydrogen as water the formula was $C_8O_{0.4}$ resulting in a C/O ratio of 20. Thus, 88% of the oxygen has been removed from the graphene oxide. X-ray diffraction and elemental analysis clearly characterized the material as multi-graphene and thus the colloid as single graphene layers in pure water that is longtime stable without additives, at present for more than one year.

Example 5

Preparation of Multi-Graphene

The dispersion of multi-graphene oxide of Example 3 was placed in an autoclave and heated for 5 hours at a temperature of 200° C. By this procedure, the multi-graphene oxide was reduced to multi-graphene. The suspension was then filtered and the obtained multi-graphene was dried.

Due to the pH of about 4 in the dispersion medium, the graphite oxide was not divided into its single layers but merely to an enlarged inter-planar distance of up to about 11 Å (a multi-graphene oxide).

If graphite oxide powder is reduced according to thermal treatment methods of the state of the art, up to about 200° C. water is removed and the inter-planar distance diminishes to about 4.4 Å while about 65% of the oxygen are removed from the graphite oxide. Temperature increase up to 1000° C. leads to further diminishing of the inter-planar distance to 3.38 Å while about 90% of the oxygen is removed.

If the thermal reduction of a dispersion of multi-graphene oxide was performed in the autoclave according to the present invention at a temperature of about 200° C., the inventive kind of reduction lead to a reduction of the oxygen content of about 90% (similar to a state of the art treatment at 1000° C.) but the inter-planar distance remained at 3.68 Å instead of the formerly found 3.38 Å. For the inventive treatment at 200° C. and more, the inventors assumed that under the thereby generated conditions, such as high pressure, the water between the layers of the multi-graphene oxide/multi-graphene cannot leave or only with difficulties, resulting in a larger inter-planar distance.

In a recently published article from Nethravathi and Rajamathi, they reported a black precipitate of aggregated graphite layers [11]. In contrast to this finding, the inventive method resulted in a stable aqueous dispersion wherein the graphene layers were not fully separated but more distant from each other than in graphite.

The different result achieved by the present inventors is assumed to be due to the fact that they ensured that all graphite oxide or graphene oxide, respectively, is colloidally dispersed, i.e. that no larger particles remain that might act as nuclei for graphene precipitation. Although Nethravathi and Rajamathi state to have started from a colloidal dispersion, the fact that they used several solvents that are unsuitable to colloidally disperse the graphite oxide, the conclusion that may be deduced thereof is that also the aqueous dispersions were not treated sufficiently long to ensure the total removal of all precipitation and agglomeration favoring particles.

Figure 3:
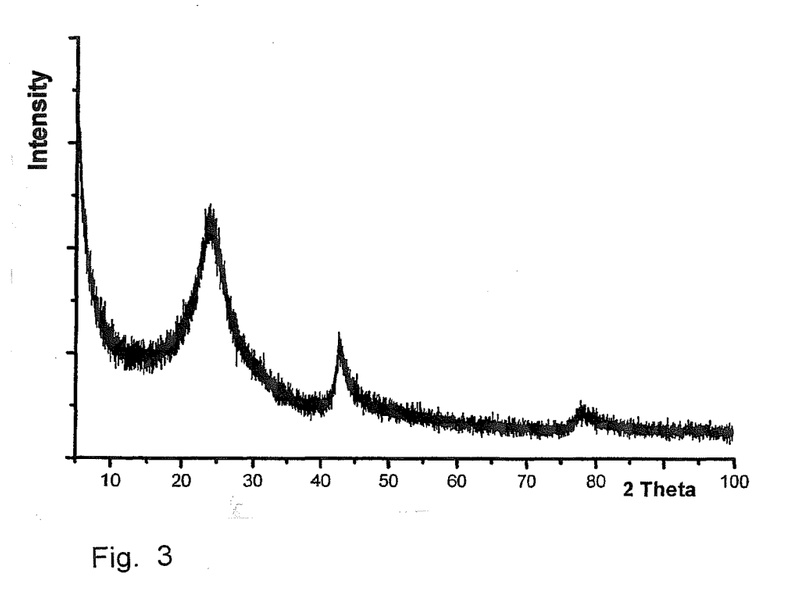
FIG. 3 is a powder diffractogram of a multi-graphene showing that the reflexes are similar to those of turbostratic graphite, but with inter-planar distances of 3.68 Å.

From the elemental analysis of the material the chemical formula $C_8O_{0.5}H_{0.3}$ was deduced and—corrected for remaining water—the formula $C_8O_{0.35}$. The C/O ratio was above 22. The powder diffractogram in FIG. 3 shows reflexes that are similar to those of turbostratic graphite but with inter-planar distances of 3.68 Å. X-ray diffraction and elemental analysis unambiguously characterize this multi-graphene material as closely related to turbostratic graphite.

Under milder reaction conditions, e.g. 140° C. for 5 hours in an autoclave, a graphite based (multi-graphene) material was obtained having a large inter-planar distance of about 4.6 Å. This material had a poor C/O ratio but was nevertheless found to have sufficient conductivity to be used as electrode material.

Example 6

Preparation of Graphene Coatings Through Thermal Reduction of Graphene Oxide Coatings

If for chemical and/or technical reasons it is impossible to produce a graphene/graphite comprising composite starting from the inventive colloidal graphene dispersion, then a multi-graphene oxide or graphene oxide comprising composite material may be produced and this material may then be reduced with the thermal reduction method of the present invention.

For example a colloidal graphene oxide dispersion was produced as described in Example 2 above. This colloidal dispersion was then applied to a quartz plate as a thin layer. The quartz plate was then immersed into acidic water of pH about 4 (acidified with hydrochloric acid) and the dispersion was then treated in an autoclave at 200° C. for 5 hours to reduce the graphene oxide layers and to consequently coat the quartz plate with graphene or multi-graphene.

Figure 4:
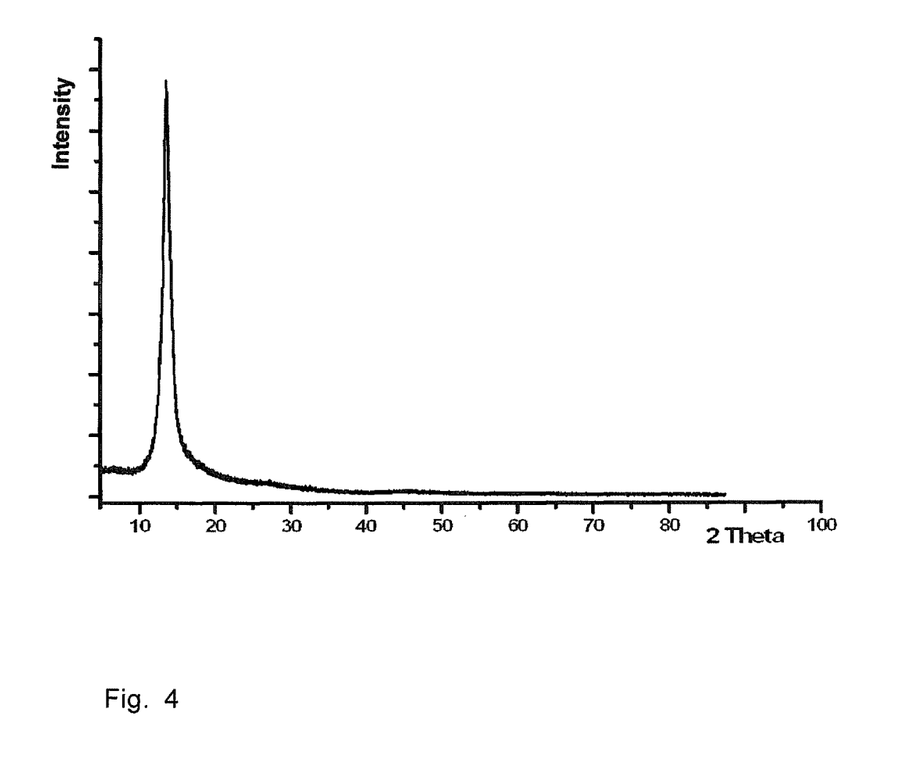
FIG. 4 shows an X-ray diffraction diagram in Brag-Brentano geometry indicating that during the coating with graphene oxide, the graphene oxide platelets during drying were deposited in a horizontal manner and formed the graphite oxide layer wise.

During the coating with graphene oxide, the graphene oxide platelets were deposited during drying in a horizontal manner and formed the multi-graphene oxide layer wise. This could be shown with X-ray diffraction in Brag-Brentano geometry (see FIG. 4). Only the 001 reflection resulting from reflection at the single graphene oxide layers could be seen. The inter-planar distance was 6.4 Å. The 100 and 110 reflections cannot be seen as it is the case with powder samples. After reduction, the layered structure was also found in the so obtained multi-graphene. In the diffractogram again only the 002 reflection of the graphite could be seen. The inter-plane distance was 3.65 Å.

The elemental analysis of the material gave the chemical formula $C_8O_{0.5}H_{0.3}$, after subtraction of hydrogen as water $C_8O_{0.3}$, and therewith a C/O ratio of above 22.

The X-ray diffraction and the elemental analysis clearly characterized the material as multi-graphene.

Example 7

Preparation of a Gold-Graphene/Multi-Graphene Composite

Figure 5:
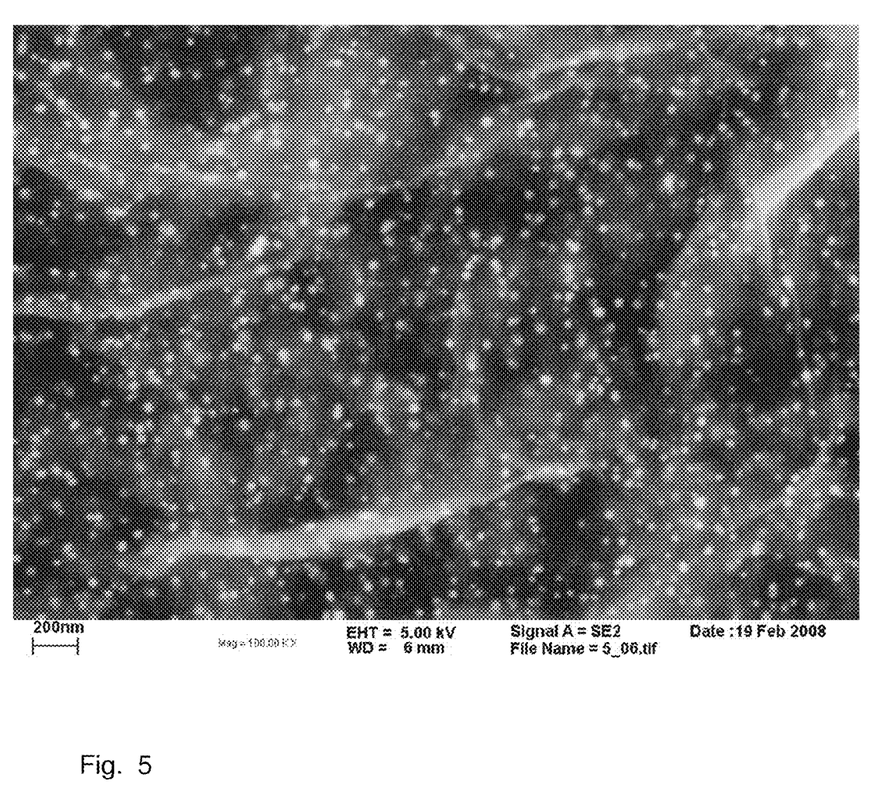
FIG. 5 shows a gold-(multi-)graphene composite that has been obtained from colloidally dispersed gold and the inventive colloidal graphene dispersion by co-precipitation.

A composite material has been obtained from colloidally dispersed gold and the colloidal graphene dispersion of Example 4 by co-precipitation. Co-precipitation was induced by adding a very small amount of an electrolyte such as sodium chloride. FIG. 5 shows such a gold-(multi-) graphene composite.

Possible Uses for the Colloidal Graphene Dispersions of the Present Invention:

Graphene single and double layers show semi-metallic features with good electrical conductivity that is almost temperature independent. Single graphene layers are interesting for fundamental electronic investigations and novel nano-electronic applications. For example the Quantum-Hall Effect at room temperature and further magneto-electrical as well as optical features may be observed [10]. Due to these features a lot of research was started on graphene by primarily practically as well as primarily theoretically interested people. Hitherto only few methods for the preparation of single graphene layers and their deposition on suitable carriers exist. Therefore the investigations that may be performed are limited. The known methods are very time consuming and have little outcome of suitable samples.

Contrary thereto, the inventive method allows the production of large quantities of graphene layers dispersed in pure water or other solvent (see above). No additives or reducing agents are needed. The C/O ratio can reach values above 25. From such a pure colloidal dispersion the single graphene layers can purposefully be deposited, e.g. between two electrodes via dielectrophoresis and subjected to specific investigations what is hardly—if at all—possible by means of e.g. the Scotch-Tape-Method.

By suitable methods layers and coatings can be produced from the colloidal graphene dispersion. Dependent on the method these can be few nanometers thin, i.e. single layers, they may be transparent and they may for example be used as replacement for indium tin oxide in organic light-emitting diodes, graphene transistors, or as thin-film solar cells. But also thicker layers may be produced such as macroscopic layers. Such macroscopic layers are e.g. multi-graphene foils and membranes that find application e.g. in electrical engineering and in desalinization. It is possible to prepare layers or coatings such that an orientation and therewith an anisotropic material results. This is also a very good and simple alternative method to the production of highly oriented pyrolytic graphite (HOPG).

The high thermal conductivity, the unusual electronic features and the high mechanical and chemical stability of graphene that exceeds those of carbon nanotubes, make graphene a much promising material for composite materials.

From colloidal graphene dispersions in various solvents composite materials with very homogeneous distribution of the materials can readily be produced. The advantage of a composite material from a colloidal graphene dispersion is especially high if the further materials of the composite (besides of the graphene) can also be applied in colloidally dispersed or at least in nanodispersed form. For example, a tin-(multi-)graphene composite or a silicon-(multi-)graphene composite are much promising materials for respective batteries, in particular if tin and silicon are also finely divided in the solvent. In FIG. 5 a gold-(multi-)graphene composite is shown that has been obtained from colloidally dispersed gold and the colloidal graphene dispersion by co-precipitation (see Example 7).

Another mode of application is the coating of a template of any shape with the colloidal graphene dispersion of the present invention. As many coatings as desired may be applied to the surface of the template and then the graphene/multi-graphene precipitated therefrom by, e.g., evaporation of the solvent. As soon as the multi-graphene layer has the desired thickness, the template may also be removed leaving a shaped carbon product with any desired form and wall thickness, wherein the arrangement of the graphene layers may be anisotropic.

An envisaged new application is the production of conducting glasses wherein the colloidal graphene dispersion is used as additive in the scope of a sol-gel-process performed by adding the dispersion to the sol or gel (e.g. water-glass).

Possible Uses for the Multi-Graphene Product of the Present Invention:

Under suitable reaction conditions, e.g. 140° C. for 5 hours in an autoclave, a carbonaceous material (multi-graphene) is obtained having a large inter-planar distance of about 4.6 Å and with sufficient conductivity to be used as electrode material. Carbonaceous materials with large interplanar distances have many advantages as electrode materials in rechargeable batteries such as easy intercalation/deintercalation of ions into/from the carbon compound.

Possible Uses for the Multi-Graphene Layers of the Present Invention:

The multi-graphene layers/coatings that may e.g. be produced according to Example 6 have applications as membranes, anisotropic conductors and super condensers.

Possible Further Uses of Products of the Present Invention:

Due to the possibility to produce carbonaceous materials with almost every C/O ratio, and on almost every substrate, such materials are also very suitable to produce condensers. For such applications, several (e.g. about 40) layers are deposited on a plastics foil such as a polyethylene or polycarbonate foil. The easy variability of the C/O ratio also favors the use of the inventive carbonaceous materials as electrode material in rechargeable lithium ion batteries.

Such electrodes for rechargeable lithium ion batteries may be prepared by a method comprising the step of providing a multi-graphene and coating a conductor with the multi-graphene, optionally in the presence of a binder.

LITERATURE

[1] Valerie C. Moore et al.; Nano Letters; 2003; 3; 1379-1382.
[2] Weijie Huang et al.; Nano Letters; 2003; 3; 565-568.
[3] Dan Li et al.; Nature Nanotechnology; 2008; 3; 101-105.
[4] Patent application no. WO 2008/048295.
[5] Ulrich Homann et al.; Zeitschrift für anorganische und allgemeine Chemie; 1937; 234; 311-336.
[6] H. P. Boehm et al.; Zeitschrift für Naturforschung; 1962; 17b; 150-153.
[7] H. P. Boehm et al.; Zeitschrift für anorganische und allgemeine Chemie; 1965; 335; 74-79.
[8] H. P. Boehm et al.; Annalen der Chemie; 1965; 691; 1-8.
[9] K. S. Kim et al., Nature Letters; 2009, 457, 706-710.
[10] A. K. Geim et al.; Nature Materials; 2007; 6; 183-191.
[11] C. Nethravathi, Michael Rajamathi; Carbon; 2008; 46; 1994.

Described above is a method for producing colloidal graphene dispersions including the steps of: (a) dispersing graphite oxide in a dispersion medium to form a colloidal graphene oxide or multi-graphene oxide dispersion; and (b) thermally reducing the graphene oxide or multi-graphene oxide in dispersion. Dependent on the method used for the preparation of the starting dispersion, a graphene or a multi-graphene dispersion is obtained that can be further processed to multi-graphene with larger inter-planar distances than graphite. Such dispersions and multi-graphenes are, for example, suitable materials in the manufacturing of rechargeable lithium ion batteries.

While there are shown and described presently preferred embodiments of the invention, it is to be distinctly understood that the invention is not limited thereto but may be otherwise variously embodied and practiced within the scope of the following claims.

What is claimed is:

1. A method for producing stable colloidal graphene dispersions or stable multi-graphene dispersions, the method comprising the steps of:
(i) stirring graphite oxide in an aqueous dispersion medium to form a dispersion;
(ii) determining if the dispersion is optically clear in a light microscope at 1000 fold magnification after 1 to 5 hours of stirring, and, if not clear, removing any undissolved impurities in the dispersion, in order to form a colloidal graphene oxide dispersion, or a multi-graphene oxide dispersion, that is optically clear in a light microscope at 1000 fold magnification; and
(iii) forming a stable colloidal graphene dispersion or a stable multi-graphene dispersion by thermally reducing the graphene oxide, or the multi-graphene oxide, in dispersion in the aqueous dispersion medium at a temperature between 120° C. and 170° C. under pressure in order to ensure that the dispersion medium is not evaporated.

2. The method of claim 1 wherein step (ii) is performed at a temperature between 130° C. and 170° C.

3. The method of claim 1 wherein step (ii) is performed at a temperature between 150° C. and 170° C.

4. The method of claim 1, wherein the dispersion medium is water, and the dispersion produced in step (i) is a colloidal graphene oxide dispersion and the dispersion produced in step (ii) is a colloidal graphene dispersion.

5. The method of claim 1, wherein the dispersion medium further comprises ammonia.

6. The method of claim 1, wherein step (ii) is performed at a temperature and for a time to result in a colloidal graphene dispersion with a carbon:oxygen (C/O) ratio of between about 4 and about 25.

7. The method of claim 1, wherein the dispersion medium is acidified water, having a pH of about 4, and the dispersion produced in step (i) is a multi-graphene oxide dispersion and the dispersion produced in step (ii) is a multi-graphene dispersion.

8. The method of claim 1, wherein step (ii) is performed at a temperature and for a time to result in a colloidal graphene dispersion with a carbon:oxygen (C/O) ratio of between about 4 and about 20.

9. The method of claim 1, wherein step (ii) is performed at a temperature and for a time to result in a colloidal graphene dispersion with a carbon:oxygen (C/O) ratio of between about 4 and about 13.5.

10. The method of claim 1, wherein step (ii) is performed at a temperature and for a time to result in a colloidal graphene dispersion with a carbon:oxygen (C/O) ratio of about 7.

11. The method of claim 1, wherein the aqueous dispersion medium consists essentially of water.

12. The method of claim 11, wherein the aqueous dispersion medium further includes ammonia.

13. The method of claim 11, wherein the aqueous dispersion medium further includes an acid.

14. A method for producing stable colloidal graphene dispersions or stable multi-graphene dispersions, the method comprising the steps of:
(i) dispersing graphite oxide in an aqueous dispersion medium to form a colloidal graphene oxide dispersion, or to form a multi-graphene oxide dispersion, that is optically clear in a light microscope at 1000 fold magnification;
(ii) forming a stable colloidal graphene dispersion or a stable multi-graphene dispersion by thermally reducing the graphene oxide, or the multi-graphene oxide, in dispersion in the aqueous dispersion medium at a temperature between 120° C. and 130° C. under pressure in order to ensure that the dispersion medium is not evaporated.

15. A method for producing stable colloidal graphene dispersions or stable multi-graphene dispersions, the method comprising the steps of:
(i) stirring not intercalated graphite oxide in an aqueous dispersion medium to form a dispersion;
(ii) determining if the dispersion is optically clear in a light microscope at 1000 fold magnification after 1 to 5 hours of stirring, and, if not clear, removing any undissolved impurities in the dispersion, in order to form a colloidal graphene oxide dispersion, or a multi-graphene oxide dispersion, that is optically clear in a light microscope at 1000 fold magnification; and (iii) forming a stable colloidal graphene dispersion or a stable multi-graphene dispersion by thermally reducing the graphene oxide, or the multi-graphene oxide, in dispersion in the aqueous dispersion medium at a temperature between 120° C. and 170° C. under pressure in order to ensure that the dispersion medium is not evaporated.

16. The method of claim 15, wherein step (ii) is performed at a temperature of 120° C. to 130° C.

17. The method of claim 15, wherein step (ii) is performed at a temperature between 130° C. and 170° C.

18. The method of claim 15, wherein step (ii) is performed at a temperature between 150° C. and 170° C.

19. The method of claim 15, wherein the dispersion medium is water, and the dispersion produced in step (i) is a colloidal graphene oxide dispersion and the dispersion produced in step (ii) is a colloidal graphene dispersion.

20. The method of claim 15, wherein the dispersion medium further comprises ammonia.

21. The method of claim 15, wherein step (ii) is performed at a temperature and for a time to result in a colloidal graphene dispersion with a carbon:oxygen (C/O) ratio of between about 4 and about 25.

22. The method of claim 15, wherein the dispersion medium is acidified water, having a pH of about 4, and the dispersion produced in step (i) is a multi-graphene oxide dispersion and the dispersion produced in step (ii) is a multi-graphene dispersion.

23. The method of claim 15, wherein step (ii) is performed at a temperature and for a time to result in a colloidal graphene dispersion with a carbon:oxygen (C/O) ratio of between about 4 and about 20.

24. The method of claim 15, wherein step (ii) is performed at a temperature and for a time to result in a colloidal graphene dispersion with a carbon:oxygen (C/O) ratio of between about 4 and about 13.5.

25. The method of claim 15, wherein the aqueous dispersion medium consists essentially of water.

26. The method of claim 25, wherein the aqueous dispersion medium further includes ammonia.

27. The method of claim 25, wherein the aqueous dispersion medium further includes an acid.

\* \* \* \* \*

UNITED STATES PATENT AND TRADEMARK OFFICE
CERTIFICATE OF CORRECTION

| | | |
|---|---|---|
| PATENT NO. | : 9,045,346 B2 | |
| APPLICATION NO. | : 12/787570 | |
| DATED | : June 2, 2015 | |
| INVENTOR(S) | : Reinhard Nesper et al. | |

It is certified that error appears in the above-identified patent and that said Letters Patent is hereby corrected as shown below:

On The Title Page, Item (73) Assignee should appear as follows:

Belenos Clean Power Holding AG, Bienne (CH)

Signed and Sealed this
Fifth Day of January, 2016

Michelle K. Lee
*Director of the United States Patent and Trademark Office*